(12) United States Patent
Wang et al.

(10) Patent No.: US 12,282,406 B2
(45) Date of Patent: Apr. 22, 2025

(54) DATA SUBSCRIPTION METHOD, APPARATUS, AND SYSTEM

(71) Applicant: Huawei Technologies Co., Ltd., Shenzhen (CN)

(72) Inventors: Zitao Wang, Nanjing (CN); Qin Wu, Nanjing (CN); Bo Wu, Nanjing (CN); Xiaopeng Qin, Beijing (CN); Yu Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/720,819

(22) Filed: Apr. 14, 2022

(65) Prior Publication Data

US 2022/0239761 A1 Jul. 28, 2022

Related U.S. Application Data

(63) Continuation of application No. PCT/CN2020/117506, filed on Sep. 24, 2020.

(30) Foreign Application Priority Data

Oct. 16, 2019 (CN) .......................... 201910984156.0
Nov. 1, 2019 (CN) .......................... 201911061501.X (51) Int. Cl.
*H04L 67/55* (2022.01)
*G06F 11/34* (2006.01)

(52) U.S. Cl.
CPC .......... *G06F 11/3409* (2013.01); *H04L 67/55* (2022.05)

(58) Field of Classification Search
CPC ........................................................ H04L 67/55
See application file for complete search history.

(56) References Cited

U.S. PATENT DOCUMENTS

2008/0313207 A1* 12/2008 Modad .............. G06F 16/24573
707/999.102
2016/0103750 A1* 4/2016 Cooper ................... G06F 9/542
719/328
(Continued)

FOREIGN PATENT DOCUMENTS

CN 102629929 A 8/2012
CN 103781028 A 5/2014
(Continued)

OTHER PUBLICATIONS

RFC 8639, E. Voit et al., "Subscription to Yang Notifications," Sep. 2019, 77 pages.
(Continued)

*Primary Examiner* — Suraj M Joshi (57) ABSTRACT

A first device generates a first capability model instance based on a capability model template, and sends the first capability model instance to a network management device. The capability model template includes one or more metric names. The first capability model instance includes one or more performance parameters that can be subscribed to by the first device, and the one or more performance parameters are parameters corresponding to one or more metric names. The first capability model instance is used by the network management device to select and subscribe to one or more performance parameters from the one or more performance parameters that can be subscribed to by the first device.

20 Claims, 5 Drawing Sheets

(56) References Cited

U.S. PATENT DOCUMENTS

2018/0270118 A1    9/2018  Lee et al.
2018/0359184 A1*  12/2018  Inbaraj ..................... H04Q 9/00
2021/0111968 A1*   4/2021  Clarke ................... H04L 43/04

FOREIGN PATENT DOCUMENTS

CN       105302826 A        2/2016
EP        2166699 A1 *      3/2010     ......... H04L 41/0681

OTHER PUBLICATIONS

RFC 8641, A. Clemm et al., "Subscription to Yang Notifications for Datastore Updates," Sep. 2019, 58 pages.

* cited by examiner

DATA SUBSCRIPTION METHOD, APPARATUS, AND SYSTEM

CROSS-REFERENCE TO RELATED APPLICATIONS

This is a continuation of International Patent Application No. PCT/CN2020/117506 filed on Sep. 24, 2020, which claims priorities to Chinese Patent Application No. 201910984156.0 filed on Oct. 16, 2019, and Chinese Patent Application No. 201911061501.X filed on Nov. 1, 2019. All of the aforementioned patent applications are hereby incorporated by reference in their entireties.

TECHNICAL FIELD

This application relates to the field of communication technologies, and in particular, to a data subscription method, apparatus, and system.

BACKGROUND

Figure 1:
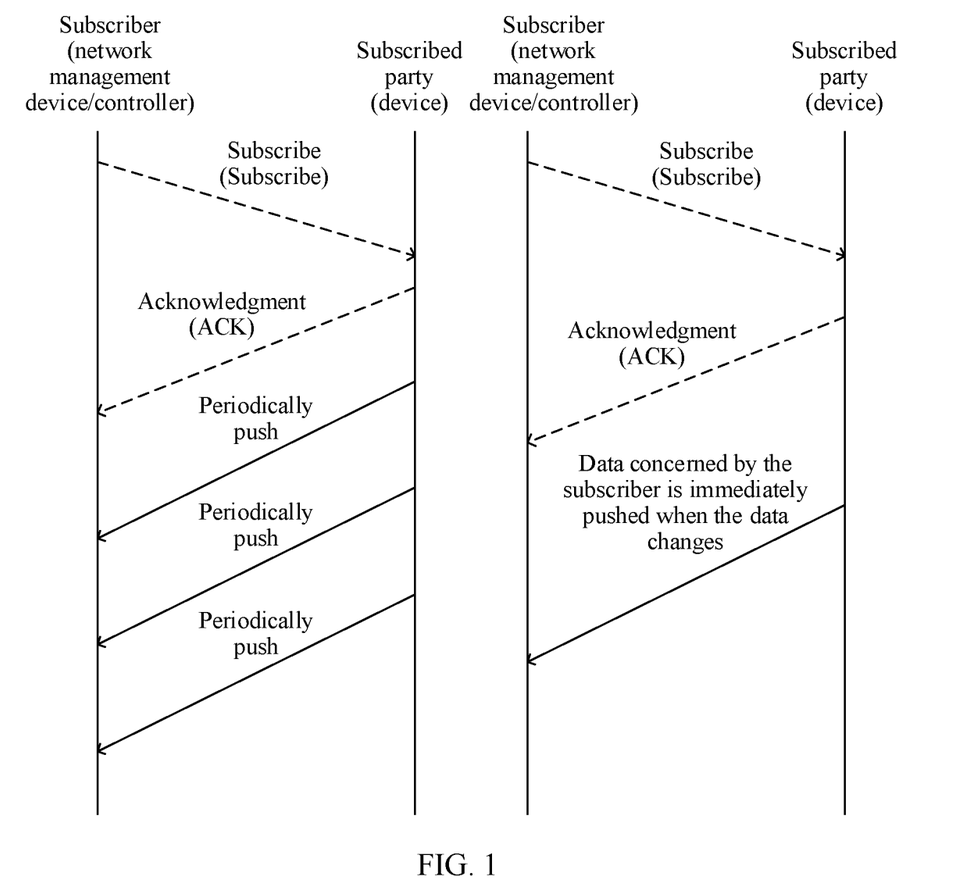
FIG. 1 is a schematic diagram of a data subscription process according to this application.

A user may obtain configuration data or status data of a device by using a subscription mechanism and a reporting mechanism in a Network Configuration Protocol (NETCONF). In a subscription process, a subscriber may specify a period for pushing data by the device as required, and the device periodically pushes subscribed data according to the period, which is shown on the left side of FIG. 1; alternatively, the subscriber may specify that data concerned by the subscriber is pushed immediately when the data concerned by the subscriber changes, and the device immediately pushes the subscribed data when determining that the data concerned by the subscriber changes, which is shown on the right side of FIG. 1. However, a subscription mode is fixed. For example, the user can only subscribe to all data of a datastore or all model-level data of a device. This results in overall inefficiencies.

SUMMARY

Embodiments of this application provide a data subscription method, apparatus, and system, to resolve a problem of low subscription efficiency in an existing subscription mode.

According to a first aspect, this application provides a data subscription method. The method includes: a first device generates a first capability model instance based on a capability model template, where the capability model template includes metric names. The first capability model instance includes performance parameters that can be subscribed to by the first device, and the performance parameters are parameters corresponding to one or more metric names in the metric names. The first device sends the first capability model instance to a network management device, where the first capability model instance is used by the network management device to select and subscribe to one or more performance parameters from the performance parameters that can be subscribed to by the first device.

By using the foregoing method, the first device may actively report the performance parameters used for subscription, so that the network management device can more accurately determine the performance parameters that need to be subscribed, to reduce redundant subscripted data and improve subscription efficiency.

In a possible design, the capability model template further includes metric types, the first capability model instance includes metric types corresponding to the performance parameters that can be subscribed to by the first device, and the metric types are group information of the performance parameters.

By using the foregoing design, the network management device may learn the metric types of the performance parameters, to improve subscription efficiency.

In a possible design, the capability model template further includes operation types, the first capability model instance includes operation types corresponding to the performance parameters that can be subscribed to by the first device, and the operation types are function operations that need to be performed on the performance parameters.

By using the foregoing design, the first device may report the function operations that need to be performed on the performance parameters. For example, the function operation may be a maximum value within a preset period, a minimum value within a preset period, a minimum variance within a preset period, an average value within a preset period, an accumulation within a preset period, an increment within a preset period, or the like.

In a possible design, the first device sends the first capability model instance to the network management device by using a collector.

By using the foregoing design, the collector may share processing pressure of the network management device, to ensure processing performance of the network management device.

In a possible design, the first device obtains an identifier of the collector sent by the network management device, where the identifier of the collector is used to identify the collector. The first device determines the collector based on the identifier of the collector. The first device sends the first capability model instance to the network management device by using the determined collector.

By using the foregoing design, the network management device may configure the identifier of the collector for the first device.

In a possible design, the first device obtains the capability model template from the network management device, or the first device obtains a stored capability model template.

By using the foregoing design, the first device may obtain the capability model template in a plurality of manners.

According to a second aspect, this application provides a data subscription method. The method includes: A collector obtains a first capability model instance from a first device, where the first capability model instance includes performance parameters that can be subscribed to by the first device. The collector sends the first capability model instance and a first identifier of the first device to a network management device. The first identifier is used to identify the first device, and the first capability model instance is used by the network management device to select and subscribe to one or more performance parameters from the performance parameters that can be subscribed to by the first device.

By using the foregoing method, the collector may share processing pressure of the network management device, to ensure processing performance of the network management device.

In a possible design, the first capability model instance further includes metric types corresponding to the performance parameters that can be subscribed to by the first device, and the metric types are group information of the performance parameters.

By using the foregoing method, the network management device may learn the metric types of the performance parameters, to improve subscription efficiency.

In a possible design, the first capability model instance further includes operation types corresponding to the performance parameters that can be subscribed to by the first device, and the operation types are function operations that need to be performed on the performance parameters.

By using the foregoing design, the first device may report the function operations that need to be performed on the performance parameters.

In a possible design, the collector obtains a second capability model instance of a second device, where the second capability model instance includes performance parameters that can be subscribed to by the second device. The collector sends the second capability model instance and a second identifier of the second device to the network management device. The second identifier is used to identify the second device, and the second capability model instance is used by the network management device to select and subscribe to one or more performance parameters from the performance parameters that can be subscribed to by the second device.

By using the foregoing design, the collector may receive the corresponding capability model instances separately sent by the plurality of devices.

In a possible design, the first identifier includes a character string of the first device or an Internet Protocol (IP) address of the first device, and the second identifier includes a character string of the second device or an IP address of the second device.

In a possible design, the collector establishes a first model based on the first capability model instance and the second capability model instance. The first model includes the identifier of the first device, the identifier of the second device, the performance parameters that can be subscribed to by the first device, and the performance parameters that can be subscribed to by the second device.

By using the foregoing design, the collector may summarize the plurality of obtained capability model instances.

In a possible design, the first model further includes the metric types corresponding to the performance parameters that can be subscribed to by the first device, the operation types corresponding to the performance parameters that can be subscribed to by the first device, metric types corresponding to the performance parameters that can be subscribed to by the second device, and operation types corresponding to the performance parameters that can be subscribed to by the second device.

According to a third aspect, this application provides a data subscription method. The method includes: A network management device obtains a first capability model instance and a first identifier of a first device, where the first capability model instance includes performance parameters that can be subscribed to by the first device, and the first identifier is used to identify the first device. The network management device determines, based on the first capability model instance, at least one of the performance parameters that can be subscribed to by the first device. The network management device sends subscription information to the first device based on the at least one performance parameter.

By using the foregoing method, the network management device obtains the first capability model instance and the first identifier of the first device, and determines, based on the first capability model instance, the performance parameters that need to be subscribed, to reduce redundant subscripted data and improve subscription efficiency.

In a possible design, the network management device receives the first capability model instance from the first device, or the network management device receives the first capability model instance and the first identifier from a collector.

By using the foregoing design, the network management device may obtain the first capability model instance and the first identifier of the first device in a plurality of manners.

In a possible design, the first identifier includes a character string of the first device or an IP address of the first device.

In a possible design, the first capability model instance includes metric types corresponding to performance parameters that can be subscribed to by the first device, and the metric types are group information of the performance parameters. The network management device determines, based on the metric types corresponding to the performance parameters that can be subscribed to by the first device and the performance parameters that can be subscribed to by the first device, the at least one of the performance parameters that can be subscribed to by the first device.

In a possible design, the first capability model instance further includes operation types corresponding to the performance parameters that can be subscribed to by the first device, and the operation types are function operations that need to be performed on the performance parameters.

By using the foregoing design, the network management device determines, based on the metric types corresponding to the performance parameters that can be subscribed to by the first device, the performance parameters that need to be subscribed, to improve subscription efficiency.

According to a fourth aspect, this application provides a data subscription device, and the device may perform the method according to any one of the first aspect or the possible implementations of the first aspect. Specifically, the device includes a unit configured to perform the method according to any one of the first aspect or the possible implementations of the first aspect.

According to a fifth aspect, this application provides a data subscription device, and the device may perform the method according to any one of the second aspect or the possible implementations of the second aspect. Specifically, the device includes a unit configured to perform the method according to any one of the second aspect or the possible implementations of the second aspect.

According to a sixth aspect, this application provides a data subscription device, and the device may perform the method according to any one of the third aspect or the possible implementations of the third aspect. Specifically, the device includes a unit configured to perform the method according to any one of the third aspect or the possible implementations of the third aspect.

According to a seventh aspect, this application provides a communication apparatus, for example, a first device; and the apparatus may be the first device, or may also be a chip in the first device. The apparatus may include a processing unit, a sending unit, and a receiving unit. It should be understood that the sending unit and the receiving unit herein each may alternatively be a transceiver unit. When the apparatus is the first device, the processing unit may be a processor, and the sending unit and the receiving unit each may be a transceiver. The first device may further include a storage unit, and the storage unit may be a memory. The storage unit is configured to store instructions or program code, and the processing unit executes the instructions or the program code stored in the storage unit, so that the first device performs the method according to any one of the first aspect or the possible designs of the first aspect. When the apparatus is the chip in the first device, the processing unit may be a processor, and the sending unit and the receiving unit each may be an input/output interface, a pin, a circuit, or the like. The processing unit executes the instructions or the program code stored in the storage unit, to enable the chip to perform the method according to any one of the first aspect or the possible designs of the first aspect. The storage unit is configured to store the instructions and the program code. The storage unit may be a storage unit (for example, a register or cache) in the chip, or a storage unit that is in the first device and that is outside the chip (for example, a read-only memory (ROM) or a random-access memory (RAM).

According to an eighth aspect, this application provides a communication apparatus, for example, a collector; and the apparatus may be the collector, or may also be a chip in the collector. The apparatus may include a processing unit, a sending unit, and a receiving unit. It should be understood that the sending unit and the receiving unit herein each may alternatively be a transceiver unit. When the apparatus is the collector, the processing unit may be a processor, and the sending unit and the receiving unit each may be a transceiver. The collector may further include a storage unit, and the storage unit may be a memory. The storage unit is configured to store instructions or program code, and the processing unit executes the instructions or the program code stored in the storage unit, so that the collector performs the method according to any one of the second aspect or the possible designs of the second aspect. When the apparatus is the chip in the collector, the processing unit may be a processor, and the sending unit and the receiving unit each may be an input/output interface, a pin, a circuit, or the like. The processing unit executes the instructions or the program code stored in the storage unit, to enable the chip to perform the method according to any one of the second aspect or the possible designs of the second aspect. The storage unit is configured to store the instructions and the program code, and the storage unit may be a storage unit (for example, a register or cache) in the chip, or a storage unit that is in the collector and that is outside the chip (for example, a ROM or a RAM.

According to a ninth aspect, this application provides a communication apparatus, for example, a network management device; and the apparatus may be the network management device, or may also be a chip in the network management device. The apparatus may include a processing unit, a sending unit, and a receiving unit. It should be understood that the sending unit and the receiving unit herein each may alternatively be a transceiver unit. When the apparatus is the network management device, the processing unit may be a processor, and the sending unit and the receiving unit each may be a transceiver. The network management device may further include a storage unit, and the storage unit may be a memory. The storage unit is configured to store instructions or program code, and the processing unit executes the instructions or the program code stored in the storage unit, so that the network management device performs the method according to any one of the third aspect or the possible designs of the third aspect. When the apparatus is the chip in the network management device, the processing unit may be a processor, and the sending unit and the receiving unit each may be an input/output interface, a pin, a circuit, or the like. The processing unit executes the instructions or the program code stored in the storage unit, to enable the chip to perform the method according to any one of the third aspect or the possible designs of the third aspect. The storage unit is configured to store the instructions and the program code. The storage unit may be a storage unit (for example, a register or cache) in the chip, or a storage unit that is in the network management device and that is outside the chip (for example, a ROM or a RAM).

According to a tenth aspect, this application further provides a computer-readable storage medium, where the computer-readable storage medium stores a computer program. When the computer program is run on a computer, the computer is enabled to perform the method according to the first aspect to the third aspect.

According to an eleventh aspect, this application further provides a computer program product that includes a program. When the computer program product is run on a computer, the computer is enabled to perform the method according to the first aspect to the third aspect.

According to a twelfth aspect, this application further provides a data subscription system, and the system includes a network management device and at least one first device. The first device may perform any method according to the first aspect, and the network management device may perform any method according to the third aspect.

According to a thirteenth aspect, this application further provides a data subscription system, and the system includes a network management device, at least one first device, and a collector. The first device may perform any method according to the first aspect, the collector may perform any method according to the second aspect, and the network management device may perform any method according to the third aspect.

In addition, for technical effects brought by any possible design manner according to the fourth aspect to the thirteenth aspect, refer to technical effects brought by different design manners in the method part. Details are not described herein again.

DESCRIPTION OF EMBODIMENTS

The following describes embodiments of this application with reference to the accompanying drawings.

Protocols related to embodiments of this application include:

1. A NETCONF is a network management protocol based on an Extensible Markup Language (XML), and provides a programmable method for configuring and managing a network device. A user may set parameters, obtain parameter values, and obtain statistics information according to the protocol. A NETCONF packet is in an XML format and has a strong filtering capability. Each data item has a fixed element name and a fixed location. In this way, different devices from a same vendor have a same access manner and a same result display manner, and devices from different vendors can achieve a same effect through XML mapping.

Therefore, a NETCONF function makes configuration and management of the network devices easier and more efficient. When the NETCONF is used to extract configuration and management data, a remote procedure call (RPC) defined by the NETCONF may be used, such as <get>, <get-config>, and <get-data>, to extract the configuration and management data.

2. A representational state transfer configuration (RESTCONF) protocol is a RESTful protocol. The RESTful protocol is carried according to a Hypertext Transfer Protocol (HTTP), may be used to access data defined in Yet Another Generation (YANG), and may use data storage defined in the NETCONF. The RESTCONF is a simplified NETCONF protocol that implements a RESTful style, and edits and queries data defined in a YANG model by using PUT/POST/DELETE/GET of the HTTP. A POST operation can also be used to execute an RPC method defined in the YANG model.

Network elements related to embodiments of this application include:

1. A network management device/a client/a subscriber (both are referred to as the network management device below) may invoke a protocol operation on a device by using the NETCONF or the RESTCONF, and may further receive subscripted data sent by a subscription device. The network management device may further interact with a collector, and obtain device-related data from the collector. In some embodiments, the network management device may alternatively be a controller.
2. A device/a server/a managed device/a subscribed party (both are referred to as the device below) may be configured to perform the protocol operation invoked by the network management device by using the NETCONF or the RESTCONF, may send the subscribed data to the network management device, and may also send a capability model instance to the network management device by using the collector.
3. The collector may be configured to collect the capability model instance of the device, and the collector may be an independent device. Therefore, the collector may perform the protocol operation invoked by the network management device by using the NETCONF or the RESTCONF, and may further send the subscripted data to the network management device. The collector and a plurality of devices may be in same networking. For example, the collector and the plurality of devices may be in a same local area network. In some embodiments, the collector and the plurality of devices may be not in the same networking. This requires that a gateway device of a subnet or a local area network in which the plurality of devices is located supports to transparently transmit information sent by a managed device in the subnet or the local area network to the network management device or the collector.

In a possible design, the network management device may send an identifier of the collector to the device, and the device may determine the collector based on the identifier. The identifier of the collector may be a character string of the collector or an IP address of the collector. For example, a device 1 to a device 10 receive an identifier of a first collector sent by the network management device, and the first collector receives capability model instances separately corresponding to the device 1 to the device 10. A device 11 to a device 20 receive an identifier of a second collector sent by the network management device, and the second collector receives capability model instances separately corresponding to the device 11 to the device 20. Therefore, each collector may summarize the capability model instances separately corresponding to the plurality of devices, and the network management device may interact with a plurality of collectors, so that the plurality of collectors may share processing pressure of the network management device. In some embodiments, device sets managed by the first collector and the second collector may also overlap, for example, the first collector manages the device 1 to the device 10, and the second collector manages the device 8 to the device 15. In this way, the device 1 to the device 10 receive the identifier of the first collector sent by the network management device, and the device 8 to the device 15 may receive the identifier of the second collector sent by the network management device.

A capability model template in embodiments of this application may include a telemetry capability model template or a monitoring capability template. In some embodiments, the capability model template may alternatively be a configuration-type model, a state-type model, or a configuration-state-combined-type model. The capability model template at least includes metric names. The metric names are description of performance parameters. The parameters corresponding to the metric names may include but are not limited to one or more of the following performance parameters: central processing unit (CPU) usage, memory usage, used disk space, a quantity of online users, an integrated uplink rate of uplink and downlink traffic (cumulative traffic), temperature, an interface uplink rate (upward speed), an interface downlink rate (downward speed), an interface uplink peak rate (upward max speed), an interface downlink peak rate (downward max speed), interface uplink traffic (upward traffic), interface downlink traffic (downward traffic), a quantity of received packets (receive packages) within an interface reporting period, a quantity of sent packets (send packages) within the interface reporting period, bandwidth usage in an inbound direction of an interface (input bandwidth utilization), bandwidth usage in an outbound direction of an interface (output bandwidth utilization), interface buffer usage (buffer used uint32), a quantity of error packets in an inbound direction of an interface (receive error packets), a quantity of discard packets of an inbound interface (input discard packets) within the interface reporting period, a quality of service (QoS) queue, and a quantity of online and offline users of wireless Internet access (such as WI-FI, BLUETOOTH, or radio access) of each board. The wireless Internet access may include radio access technologies, such as a Global System for Mobile communication (GSM) system, a General Packet Radio Service (GPRS), a code-division multiple access (CDMA), a Universal Mobile Telecommunication System (UMTS), Wideband Code Division Multiple Access (W-CDMA), Long Term Evolution (LTE), and the fifth generation (5G) mobile communication system or a future sixth generation (6G) mobile communication system.

Optionally, the capability model template further includes metric types. The metric types are group information of the performance parameters. For example, the metric types include a system, a general-purpose interface, a specific interface, or the like. Metric types of parameters such as the CPU usage, the memory usage, the used disk space, and the quantity of online users of each board are the system; metric types of parameters such as the interface uplink rate, the interface downlink rate, and the QoS queue of each board are the general interface; and metric types of parameters such as the quantity of online and offline users of each board are the specific interface.

Optionally, the capability model template further includes operation types (operation types). The operation types are function operations that need to be performed on the performance parameters. A parameter reported based on a preset period of a performance parameter may be a current value of the performance parameter, or one or more of a minimum value, a maximum value, a minimum variance, an average value, an accumulation, or an increment of the performance parameter within the preset period. Therefore, the function operation may be the maximum value within the preset period, the minimum value within the preset period, the minimum variance within the preset period, the average value within the preset period, the accumulation within the preset period, or the increment within the preset period. In addition, the function operation may alternatively be in another calculation form. This is not limited in this application.

For example, an operation type of the integrated uplink rate of uplink and downlink traffic is an accumulation within a preset period, and a parameter reported based on the preset period of the integrated uplink rate of uplink and downlink traffic is accumulation traffic of the integrated uplink rate of uplink and downlink traffic within the preset period. An operation type of the interface uplink rate is an average value within a preset period, and a parameter reported based on the preset period of the interface uplink rate is an average value of the interface uplink rate within the preset period. An operation type of the interface downlink rate is an average value within a preset period, and a parameter reported based on the preset period of the interface downlink rate is an average value of the interface downlink rate within the preset period. An operation type of the interface uplink traffic is an accumulation within the preset period, and a parameter reported based on the preset period of the interface uplink traffic is an accumulation of the interface uplink traffic within the preset period. An operation type of the interface downlink traffic is an accumulation within the preset period, and a parameter reported based on the preset period of the interface downlink traffic is an accumulation of the interface downlink traffic within the preset period.

For example, the following is an example of the capability model template. It should be understood that the capability model template may alternatively be in another form. The following content is not intended to limit this application:

```
ro datastore-capabilities* [datastore]
   +--ro datastore      -> /yanglib:yang-library/datastore/name
   +--ro telemetry-capability
      +--ro per-node-capabilities* [node-selector]
         +--ro node-selector        nacm:node-instance-identifier
         +--ro (update-period)?
         |  +--:(minimum-update-period)
         |  |  +--ro minimum-update-period?      uint32
         |  +--:(supported-update-period)
         |     +--ro supported-update-period*    uint32
         +--ro max-objects-per-update?           uint32
         +--ro minimum-dampening-period?         uint32
         +--ro on-change-supported?              notification-support
         +--ro periodic-notifications-supported? notification-support
         +--ro metric-name                       string
         +--ro metric-type                       metric-type
         +--ro operation-type                    operation-type
```

The metric-name in the last but two line of the code is a metric name, the metric-type in the last but one line of the code is a metric type, and the operation-type in the last line of the code is an operation type.

Specific content after the metric-type in the last but one line is expanded may be as follows:

```
typedef metric-type {
   type enumeration {
      enum "system" {
         description
            "system metric"
      }
      enum "interface" {
         description
            "interface metric"
      }
      enum "VPN" {
         description
            "VPN metric"
      }
   }
}
```

Specific content after the operation-type in the last line is expanded may be as follows:

```
typedef operation-type {
   type enumeration {
      enum "Min" {
         description
            "a minimum value within a preset period";
      }
      enum "Max" {
         description
            "a maximum value within a preset period";
      }
      enum "sum" {
         description
            "an accumulation within a preset period";
      }
   }
}
```

Embodiment 1

Figure 2:
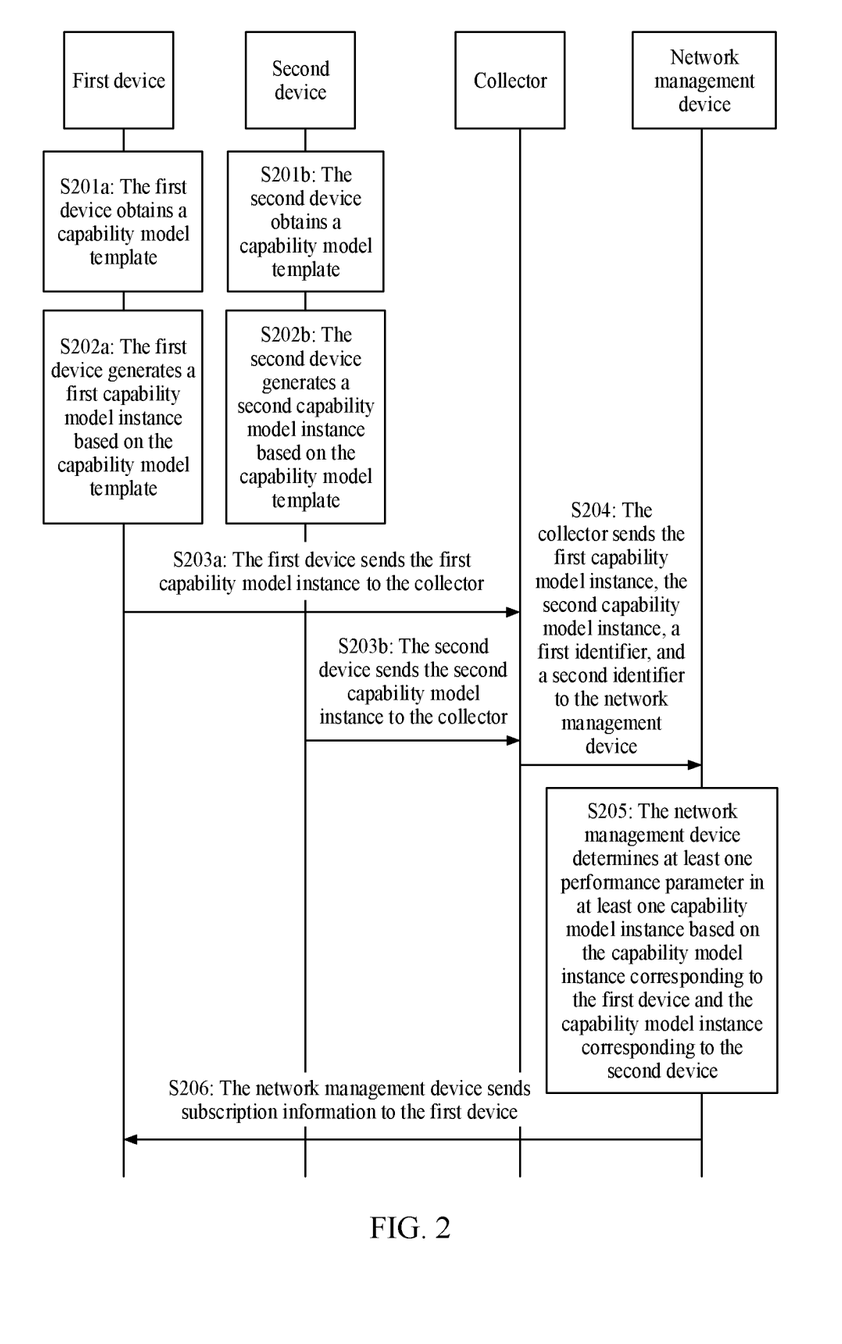
FIG. 2 is a flowchart 1 of a data subscription method according to this application.
Figure 3:
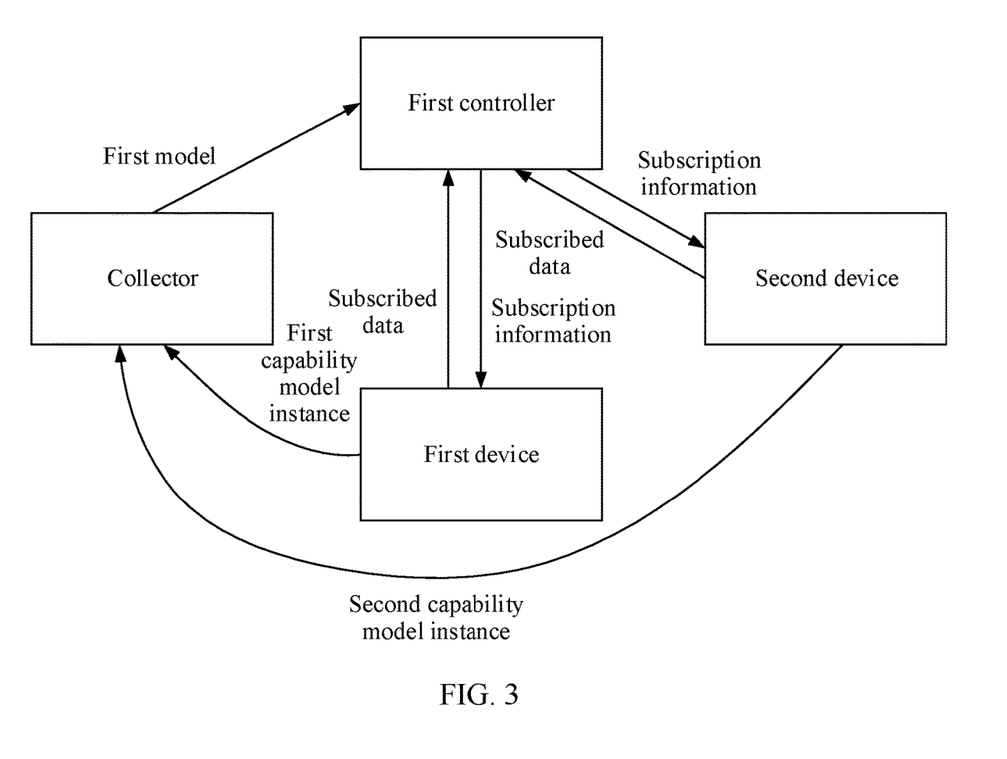
FIG. 3 is a schematic diagram of a structure of a first system according to this application.

As shown in FIG. 2, an embodiment of this application provides a data subscription method, where the method is applied to a first system. As shown in FIG. 3, the first system includes a first device, a second device, a collector, and a network management device. It should be understood that the following uses only the first system as an example for description. In an actual application, the first system may further include the first device, the second device, the collector, the network management device, a third device, or more devices. This is not limited in this application. The method specifically includes the following steps:

S201a: The first device obtains a capability model template. The capability model template includes metric names.

In an example, the first device may download the capability model template by using a network. For example, the first device downloads the capability model template from the collector, the network management device, or a World Wide Web (WWW) server. It should be understood that the first device may further obtain the capability model template from another device. This is not limited in this application. In another example, the first device may obtain a stored capability model template.

S201b: The second device obtains a capability model template.

For obtaining the capability model template by the second device, refer to content in S201a. Repeated content is not described again.

S202a: The first device generates a first capability model instance based on the capability model template. The first capability model instance includes performance parameters that can be subscribed to by the first device. The performance parameters that can be subscribed to by the first device are parameters corresponding to one or more metric names in the metric names.

S202b: The second device generates a second capability model instance based on the capability model template. The second capability model instance includes performance parameters that can be subscribed to by the second device. The performance parameters that can be subscribed to by the second device are parameters corresponding to one or more metric names in the metric names.

The first device generates the first capability model instance based on a capability of the first device and the capability model template, and the second device generates the second capability model instance based on a capability of the second device and the capability model template. Generally, the capability of the first device is different from the capability of the second device. Therefore, the performance parameters that can be subscribed to by the first device are also different from the performance parameters that can be subscribed to by the second device, and the first capability model instance is also different from the second capability model instance.

For example, the performance parameters that can be subscribed to by the first device include CPU usage and memory usage of each board, and the performance parameters that can be subscribed to by the second device include CPU usage and memory usage, a quantity of online users, an interface uplink rate, and an interface downlink rate of each board.

In a possible design, if the capability model template further includes metric types, the first capability model instance includes metric types corresponding to the performance parameters that can be subscribed to by the first device, and the second capability model instance includes metric types corresponding to the performance parameters that can be subscribed to by the second device.

For example, if the performance parameters that can be subscribed to by the first device include the CPU usage and the memory usage of each board, metric types of the CPU usage and the memory usage of each board are a system. If the performance parameters that can be subscribed to by the second device include the CPU usage, the memory usage, the quantity of online users, the interface uplink rate, and the interface downlink rate of each board, metric types of the CPU usage, the memory usage, and the quantity of online users of each board are a system, and metric types of the interface uplink rate and the interface downlink rate are a general interface.

In a possible design, if the capability model template further includes operation types, the first capability model instance includes operation types corresponding to the performance parameters that can be subscribed to by the first device, and the second capability model instance includes operation types corresponding to the performance parameters that can be subscribed to by the second device.

For example, if the performance parameters that can be subscribed to by the first device include the CPU usage and the memory usage of each board, operation types of the CPU usage and the memory usage of each board are a current value. If the performance parameters that can be subscribed to by the second device include the CPU usage, the memory usage, the quantity of online users, the interface uplink rate, and the interface downlink rate of each board, operation types of the CPU usage, the memory usage, and the quantity of online users of each board are a current value, and operation types of the interface uplink rate and the interface downlink rate are an average value within a preset period.

For example, it is assumed that the capability model template includes the metric names, the metric types, and the operation types; and the first device supports a node 1 to a node 6, in other words, the first device supports to subscribe to six performance parameters. The following is a summary of the first capability model instance. It should be understood that the first capability model instance may alternatively be in another form. The following content is not intended to limit this application:

Node 1: metric-name: CPU usage
node 1-xpath (corresponding to node-selector in a capability model template)
MT (corresponding to metric-type in a capability model template): a system
OPT (corresponding to operation-type in a capability model template): a current value
Node 2: metric-name: a quantity of online users
node 2-xpath
MT: a system
OPT: a current value
Node 3: metric-name: accumulation traffic within a reporting period
node 3-xpath
MT: a system
OPT: an accumulation of uplink and downlink traffic within a preset period
Node 4: metric-name: an interface uplink rate
node 4-xpath
MT: an interface
OPT: an average value within a preset period
Node 5: metric-name: an interface downlink rate
node 5-xpath
MT: an interface
OPT: an average value within a preset period
Node 6: metric-name: a quantity of discard packets of an inbound interface within an interface reporting period
node 6-xpath
MT: an interface
OPT: an increment within a preset period XML Path Language (XPath) is a path language, and is a computer language used to determine a location of a part of an XML document. The XPath provides an ability to find nodes in a data structure tree based on an XML tree-like structure.

S203a: The first device sends the first capability model instance to the collector. Correspondingly, the collector receives the first capability model instance.

In addition, S203a may be alternatively described as that the first device registers the first capability model instance with the collector.

Optionally, before S203a, the collector may send a capability model instance request message to the first device; and after receiving the capability model instance request message, the first device sends the first capability model instance to the collector.

S203b: The second device sends the second capability model instance to the collector. Correspondingly, the collector receives the second capability model instance.

In addition, S203b may be alternatively described that the second device registers the second capability model instance with the collector.

S204: The collector sends the first capability model instance, a first identifier, the second capability model instance, and a second identifier to the network management device. Correspondingly, the network management device receives the first capability model instance, the first identifier, the second capability model instance, and the second identifier from the collector.

Alternatively, S204: The collector establishes a first model based on the first capability model instance and the second capability model instance, and the collector sends the first model to the network management device. Correspondingly, the network management device receives the first model.

The first model includes the identifier of the first device, the identifier of the second device, the performance parameters that can be subscribed to by the first device, and the performance parameters that can be subscribed to by the second device. The first identifier includes a character string of the first device or an IP address of the first device, and the second identifier includes a character string of the second device or an IP address of the second device. The first model further includes the metric types corresponding to the performance parameters that can be subscribed to by the first device, the operation types corresponding to the performance parameters that can be subscribed to by the first device, the metric types corresponding to the performance parameters that can be subscribed to by the second device, and the operation types corresponding to the performance parameters that can be subscribed to by the second device.

For example, the following is an example of the first model summarized by the collector. It should be understood that the first model may alternatively be in another form. The following content is not intended to limit this application:

```
+--ro telemetry-library
   +--ro device*[id]
      +--ro id           string
      +--ro ip           inet-ip
      +--ro datastore-capabilities* [datastore]
      +--ro datastore           -> /yanglib:yang-library/datastore/name
      +--ro per-node-capabilities* [node-selector]
         +--ro node-selector          nacm:node-instance-identifier
         +--ro (update-period)?
         |  +--:(minimum-update-period)
         |  |  +--ro minimum-update-period?         uint32
         |  +--:(supported-update-period)
         |     +--ro supported-update-period*       uint32
         +--ro max-objects-per-update?              uint32
         +--ro minimum-dampening-period?            uint32
         +--ro on-change-supported?                 notification-support
         +--ro periodic-notifications-supported? notification-support
         +--ro metric-type                          metric-type
         +--ro operation-type                       operation-type
         +--ro metric-name                          string
```

S205: The network management device determines at least one performance parameter in at least one capability model instance based on the first capability model instance and the second capability model instance.

Specifically, the network management device determines, based on the first capability model instance, the at least one of the performance parameters that can be subscribed to by the first device; alternatively, the network management device determines, based on the second capability model instance, the at least one of the performance parameters that can be subscribed to by the second device; alternatively, the network management device determines, based on the first capability model instance and the second capability model instance, the at least one of the performance parameters that can be subscribed to by the first device and the at least one of the performance parameters that can be subscribed to by the second device.

By using the foregoing method, the network management device may directly determine, based on each capability model instance, whether there is a performance parameter that needs to be subscribed in the capability model instance.

In a possible design, the network management device determines, based on the metric types corresponding to the performance parameters that can be subscribed to by the first device and the performance parameters that can be subscribed to by the first device, the at least one of the performance parameters that can be subscribed to by the first device. The network management device determines, based on the metric types corresponding to the performance parameters that can be subscribed to by the second device and the performance parameters that can be subscribed to by the second device, the at least one of the performance parameters that can be subscribed to by the second device.

For example, the network device may select a performance parameter whose metric type is the system in the performance parameters that can be subscribed to by the first device, or the network device may select a performance parameter whose metric type is the general interface in the performance parameters that can be subscribed to by the first device.

By using the foregoing design, the network management device may determine, based on the metric types, the parameters that need to be subscribed, to improve subscription efficiency.

S206: The network management device sends subscription information to devices separately corresponding to the at least one capability model instance determined in S205.

For example, as shown in FIG. 2, it is assumed that the at least one performance parameter in the at least one capability model instance determined in S205 is the at least one performance parameter in the first capability model instance, the network management device sends the subscription information to the first device.

It should be understood that FIG. 2 is merely an example, and may further include another possible scenario. For example, it is assumed that the at least one performance parameter in the at least one capability model instance determined in S205 is the at least one performance parameter in the second capability model instance, the network management device sends the subscription information to the second device. For another example, it is assumed that the at least one performance parameter in the at least one capability model instance determined in S205 includes the at least one performance parameter in the first capability model instance and the at least one performance parameter in the second capability model instance, the network management device sends the subscription information corresponding to the first device to the first device. The network management device further sends the subscription information corresponding to the second device to the second device.

By using the foregoing Embodiment 1, the first device may actively report the performance parameters used for subscription, so that the network management device can more accurately determine the performance parameters that need to be subscribed, to reduce redundant subscripted data and improve subscription efficiency.

Embodiment 2

Figure 4:
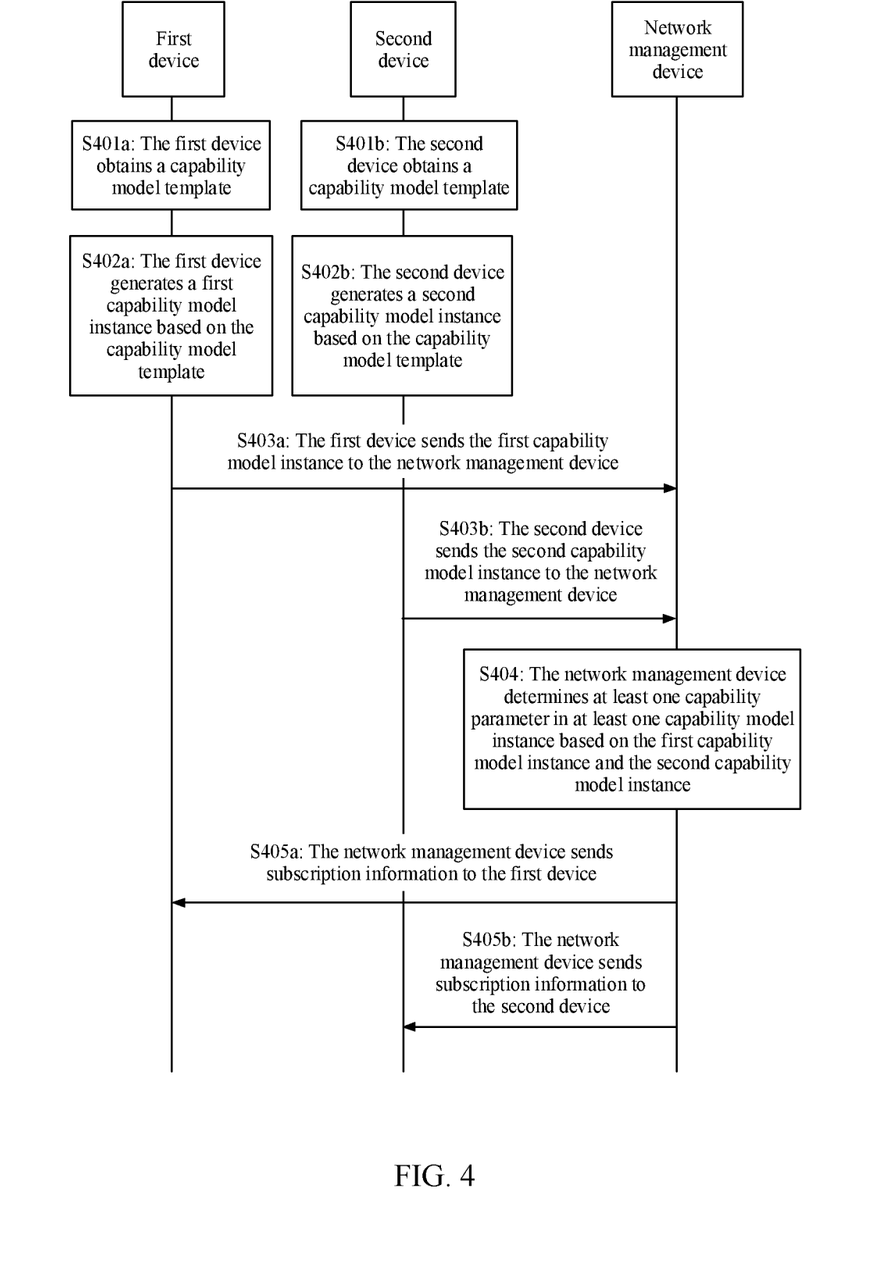
FIG. 4 is a flowchart 2 of a data subscription method according to this application.

Refer to FIG. 4. An embodiment of this application provides a data subscription method, where the method is applied to a second system. The second system includes a first device, a second device, and a network management device. It should be understood that the following uses the second system as an example for description. In an actual application, the second system may further include a third device or more devices. This is not limited in this application. The method specifically includes the following steps:

S401a: The first device obtains a capability model template.

For details, refer to the content in S201a. Repeated content is not described again.

S401b: The second device obtains a capability model template.

For details, refer to the content in S201a. Repeated content is not described again.

S402a: The first device generates a first capability model instance based on the capability model template. The first capability model instance includes performance parameters that can be subscribed to by the first device.

For details, refer to the content in S201a. Repeated content is not described again.

S402b: The second device generates a second capability model instance based on the capability model template. The second capability model instance includes performance parameters that can be subscribed to by the second device.

For details, refer to the content in S201a. Repeated content is not described again.

S403a: The first device sends the first capability model instance to a network management device. Correspondingly, the network management device receives the first capability model instance.

S403b: The second device sends the second capability model instance to the network management device. Correspondingly, the network management device receives the second capability model instance.

S404: The network management device determines at least one performance parameter in at least one capability model instance based on the first capability model instance and the second capability model instance.

For a specific method in which the network management device determines the at least one performance parameter in the at least one capability model instance based on the first capability model instance and the second capability model instance, refer to the content in S205. Repeated content is not described again.

S405a: The network management device sends subscription information to the first device.

S405b: The network management device sends subscription information to the second device.

Refer to FIG. 4. It is assumed that the at least one performance parameter in the at least one capability model instance determined in S404 includes at least one performance parameter in the first capability model instance and at least one performance parameter in the second capability model instance, the network management device sends the subscription information corresponding to the first device to the first device, and the network management device further sends the subscription information corresponding to the second device to the second device. It should be understood that this is merely an example, and another possible scenario may be further included. For specific content, refer to the content in S206. Repeated content is not described again.

Differences between Embodiment 2 and Embodiment 1 lie in that a system corresponding to Embodiment 2 does not include the collector, and Embodiment 2 is applicable to a scenario in which a quantity of devices is small in the system; and Embodiment 1 is applicable to a scenario in which the quantity of devices is large in the system.

In the foregoing embodiments provided in this application, various solutions of the communication method provided in embodiments of this application are separately described from perspectives of network elements and interaction between the network elements. It may be understood that, to implement the foregoing functions, the network elements, such as a network device and a terminal device, include a corresponding hardware structure and/or software module that is used to perform each function. A person skilled in the art should be easily aware that, in combination with the examples of units and algorithm steps described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 5:
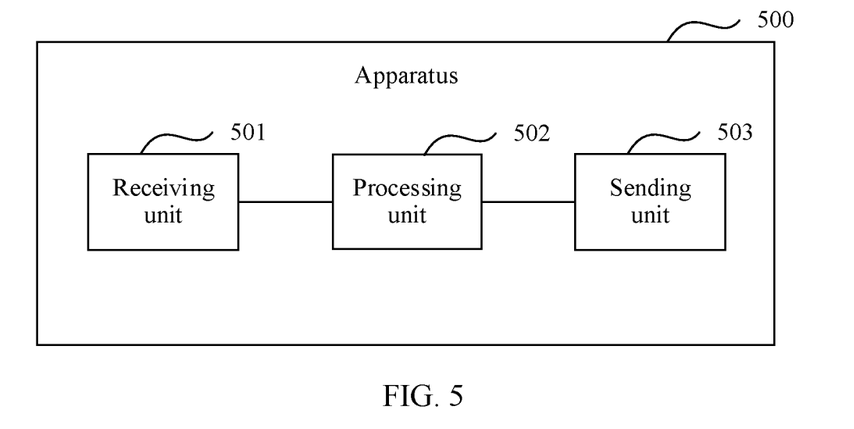
FIG. 5 is a schematic diagram of a structure 1 of an apparatus according to this application.

Same as the foregoing concept, as shown in FIG. 5, this application further provides an apparatus 500, where the apparatus 500 includes a receiving unit 501, a processing unit 502, and a sending unit 503.

In an example, the apparatus 500 is configured to implement a function of a first device in the foregoing methods. The apparatus may be the first device, or may also be an apparatus in the first device, for example, a chip system.

The receiving unit 501 is configured to perform S201a and S206 in the foregoing Embodiment 1, or configured to perform S201a and 405a in the foregoing Embodiment 2.

The sending unit 503 is configured to perform S203a in the foregoing Embodiment 1, or configured to perform S403a in the foregoing Embodiment 2.

The processing unit is configured to perform S202a in the foregoing Embodiment 1, or configured to perform S402a in the foregoing Embodiment 2.

In an example, the apparatus 500 is configured to implement a function of a collector in the foregoing methods. The apparatus may be the collector, or may also be an apparatus in the collector, for example, a chip system.

The receiving unit 501 is configured to perform S203a and S203b in the foregoing Embodiment 1.

The sending unit 503 is configured to perform S204 in the foregoing Embodiment 1.

The processing unit 502 is configured to perform S204 in the foregoing Embodiment 1.

In an example, the apparatus 500 is configured to implement a function of a network management device in the foregoing methods. The apparatus may be the network management device, or may also be an apparatus in the network management device, for example, a chip system.

The receiving unit 501 is configured to perform S204 in the foregoing Embodiment 1, or configured to perform S403a and S403b in the foregoing Embodiment 2.

The sending unit 503 is configured to perform S206 in the foregoing Embodiment 1, or configured to perform S404 in the foregoing Embodiment 2.

The processing unit is configured to perform S205 in the foregoing Embodiment 1, or configured to perform S405a and S405b in the foregoing Embodiment 2.

For specific execution processes of the processing unit 502, the receiving unit 501, and the sending unit 503, refer to the description in the foregoing method embodiments. Module division in this embodiment of this application is merely an example, is merely logical function division, and there may be another division manner in actual implementation. In addition, functional modules in embodiments of this application may be integrated into one processor, or each of the modules may exist alone physically, or two or more modules are integrated into one module. The integrated module may be implemented in a form of a hardware, or may be implemented in a form of a software functional module.

As another variant, the apparatus may be a chip system. In this embodiment of this application, the chip system may include a chip, or may include the chip and another discrete component. For example, the apparatus includes a processor and an interface, and the interface may be an input/output interface. The processor implements the function of the processing unit 502, and the interface implements the function of the processing unit 502. The apparatus may further include a memory, where the memory is configured to store a program that can be run on the processor. When the processor executes the program, the methods in the foregoing embodiments are performed.

Figure 6:
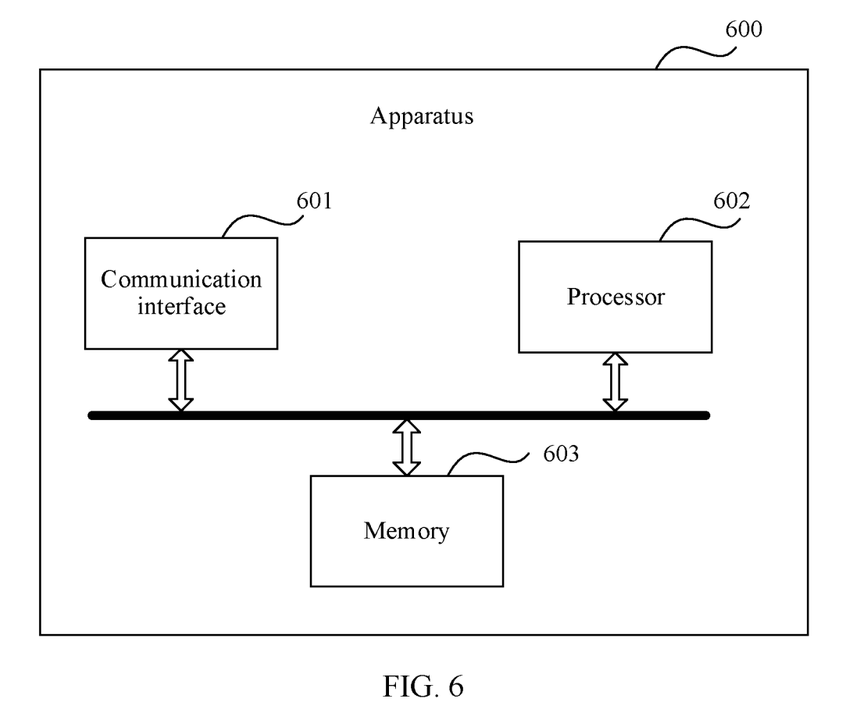
FIG. 6 is a schematic diagram of a structure 2 of an apparatus according to this application.

Same as the foregoing concept, as shown in FIG. 6, an embodiment of this application further provides an apparatus 600. The apparatus 600 includes a communication interface 601, at least one processor 602, and at least one memory 603. The communication interface 601 is configured to communicate with another device by using a transmission medium, so that an apparatus in the apparatus 600 can communicate with the other device. The memory 603 is configured to store a computer program. The processor 602 invokes the computer program stored in the memory 603, to send and receive data through the communication interface 601, and implement the methods in the foregoing embodiments.

For example, when the apparatus is a first device, the memory 603 is configured to store the computer program. The processor 602 invokes the computer program stored in the memory 603, and performs, through the communication interface 601, the methods performed by the first device in the foregoing embodiments. When the apparatus is a collector, the memory 603 is configured to store the computer program. The processor 602 invokes the computer program stored in the memory 603, and performs, through the communication interface 601, the methods performed by the collector in the foregoing embodiments. When the apparatus is a network management device, the memory 603 is configured to store the computer program. The processor 602 invokes the computer program stored in the memory 603, and performs, through the communication interface 601, the methods performed by the network management device in the foregoing embodiments.

In this embodiment of this application, the communication interface 601 may be a transceiver, a circuit, a bus, a module, or a communication interface of another type. The processor 602 may be a general-purpose processor, a digital signal processor, an application-specific integrated circuit, a field programmable gate array or another programmable logic device, a discrete gate or transistor logic device, or a discrete hardware component. The processor 602 may implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module. The memory 603 may be a nonvolatile memory, for example, a hard disk drive (HDD) or a solid-state drive (SSD); or may be a volatile memory, for example, a RAM. The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function. The memory 603 is coupled to the processor 602. Coupling in this embodiment of this application may be indirect coupling or a communication connection between apparatuses, units, or modules in an electrical form, a mechanical form, or another form, and is used for information exchange between the apparatuses, the units, or the modules. In another implementation, the memory 603 may alternatively be located outside the apparatus 600. The processor 602 may cooperate with the memory 603. The processor 602 may execute instructions or the program code stored in the memory 603. At least one of at least one memory 603 may alternatively be included in the processor 602. A specific connection medium among the foregoing communication interface 601, the processor 602, and the memory 603 is not limited in this embodiment of this application. For example, in this embodiment of this application, the memory 603, the processor 602, and the communication interface 601 may be connected through a bus in FIG. 6. The bus may be classified into an address bus, a data bus, a control bus, or the like.

It may be understood that the apparatus in the embodiment shown in FIG. 5 may be implemented by using the apparatus 600 shown in FIG. 6. Specifically, the processing unit 502 may be implemented by the processor 602, and the processing unit 502 may be implemented by the communication interface 601.

An embodiment of this application further provides a computer-readable storage medium, where the computer-readable storage medium stores a computer program. When the computer program is run on a computer, the computer is enabled to perform the methods in the foregoing embodiments.

An embodiment of this application provides a system, where the system includes at least one device, a collector, and a network management device. The at least one device may be configured to perform the method shown by the first device or the second device in Embodiment 1, the collector may be configured to perform the method shown by the collector in Embodiment 1, and the network management device may be configured to perform the method shown by the network management device in Embodiment 1.

An embodiment of this application provides a system, where the system includes at least one device and a network management device. The at least one device may be configured to perform the method shown by the first device or the second device in Embodiment 2, and the network management device may be configured to perform the method shown by the network management device in Embodiment 2.

All or some of the foregoing methods provided in embodiments of this application may be implemented through software, hardware, firmware, or any combination thereof. When the software is used to implement the methods, all or some of the methods may be implemented in a form of a computer program product. The computer program product includes one or more computer instructions or program code. When the computer program instructions or the program code is loaded and executed on a computer, procedures or functions according to embodiments of this application are all or partially generated. The computer may be a general-purpose computer, a dedicated computer, a computer network, a network device, user equipment, or another programmable apparatus. The computer instructions or the program code may be stored in a computer-readable storage medium or may be transmitted from a computer-readable storage medium to another computer-readable storage medium. For example, the computer instructions or the program code may be transmitted from a website, a computer, a server, or a data center to another website, another computer, another server, or another data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, an SSD, or the like.

The foregoing embodiments are merely used to describe the technical solutions of this application. The description of the foregoing embodiments is merely intended to help understand the method of embodiments of this application, and shall not be construed as a limitation on embodiments of this application. Variations or replacements readily figured out by a person skilled in the art shall fall within the protection scope of embodiments of this application.

What is claimed is:

1. A data subscription method implemented by a first device, wherein the data subscription method comprises:
generating, based on a capability model template, a first capability model instance, wherein the capability model template comprises one or more metric names, wherein the first capability model instance comprises one or more performance parameters that can be subscribed to by the first device, wherein the one or more performance parameters that can be subscribed to by the first device correspond to the one or more metric names; and
sending the first capability model instance to a network management device,
wherein the first capability model instance is configured to be used by the network management device to select a subset of the one or more performance parameters, and
wherein the capability model template and the first capability model instance comprise one or more metric names corresponding to the one or more performance parameters and indicating group information of the subset of performance parameters.

2. The data subscription method of claim 1, wherein the capability model template and the first capability model instance comprise one or more operation types corresponding to the one or more performance parameters, and wherein the one or more operation types indicate function operations that need to be performed on the performance parameters.

3. The data subscription method of claim 1, wherein sending the first capability model instance further comprises sending the first capability model instance to the network management device by using a collector.

4. The data subscription method of claim 3, further comprising:
obtaining an identifier of the collector from the network management device, wherein the identifier identifies the collector;
determining, based on the identifier, the collector; and
sending the first capability model instance to the network management device by using the collector.

5. The data subscription method of claim 1, further comprising obtaining the capability model template from the network management device.

6. The data subscription method of claim 1, further comprising obtaining the capability model template from storage in the first device.

7. The data subscription method of claim 1, wherein the one or more metric types further indicate at least one of: a CPU usage, a memory usage, a used disk space, a quantity of online users of each board, an interface uplink rate, an interface downlink rate, a QoS queue of each board, and a quantity of online and offline users of each board.

8. An apparatus, comprising:
at least one processor;
one or more memories coupled to the at least one processor and configured to store instructions, which when executed by the at least one processor, cause the apparatus to:
generate, based on a capability model template, a first capability model instance, wherein the first capability model instance comprises one or more metric names, wherein the first capability model instance comprises one or more performance parameters that can be subscribed to by the apparatus, wherein the one or more performance parameters that can be subscribed to by the first device correspond to the one or more metric names; and
send the first capability model instance to a network management device,
wherein the first capability model instance is configured to be used by the network management device to select a subset of the one or more performance parameters,
wherein the capability model template and the first capability model instance comprise one or more metric names corresponding to the one or more performance parameters and indicating group information of the subset of performance parameters.

9. The apparatus of claim 8, wherein the capability model template and the first capability model instance comprise one or more operation types corresponding to the one or more performance parameters, and wherein the one or more operation types indicate function operations that need to be performed on the performance parameters.

10. The apparatus of claim 8, wherein the instructions further cause the apparatus to send the first capability model instance to the network management device by using a collector.

11. The apparatus of claim 10, wherein the instructions further cause the apparatus to:
obtain an identifier of the collector from the network management device, wherein the identifier identifies the collector;
determine, based on the identifier, the collector; and
send the first capability model instance to the network management device by using the collector.

12. The apparatus of claim 8, wherein the instructions further cause the apparatus to obtain the capability model template from the network management device.

13. The apparatus of claim 8, wherein the instructions further cause the apparatus to obtain a stored capability model template.

14. The apparatus of claim 8, wherein the one or more metric types further indicate at least one of: a CPU usage, a memory usage, a used disk space, a quantity of online users of each board, an interface uplink rate, an interface downlink rate, a QoS queue of each board, and a quantity of online and offline users of each board.

15. A computer program product comprising computer-executable instructions stored on a non-transitory computer-readable storage medium that, when executed by one or more processors, cause a first device to:
generate, based on a capability model template, a first capability model instance, wherein the capability model template comprises one or more metric names, wherein the first capability model instance comprises one or more performance parameters that can be subscribed to by the first device, wherein the one or more performance parameters that can be subscribed to by the first device are parameters corresponding to the one or more metric names; and
send, by the first device, the first capability model instance to a network management device, wherein the first capability model instance is configured to be used by the network management device to select a subset of the one or more performance parameters,
wherein the capability model template and the first capability model instance comprise one or more metric names corresponding to the one or more performance parameters and indicating group information of the subset of performance parameters.

16. The computer program product of claim 15, wherein the capability model template and the first capability model instance comprise one or more operation types corresponding to the one or more performance parameters, and wherein the one or more operation types indicate function operations that need to be performed on the performance parameters.

17. The computer program product of claim 15, wherein the instructions further cause the first device to send the first capability model instance to the network management device by using a collector.

18. The computer program product of claim 17, wherein the instructions further cause the first device to:
obtain an identifier of the collector from the network management device, wherein the identifier identifies the collector;
determine, based on the identifier, the collector; and
send the first capability model instance to the network management device by using the collector.

19. The computer program product of claim 15, wherein the instructions further cause the first device to:
obtain the capability model template from the network management device; or
obtain a stored capability model template.

20. The computer program product of claim 15, wherein the one or more metric types further indicate at least one of: a CPU usage, a memory usage, a used disk space, a quantity of online users of each board, an interface uplink rate, an interface downlink rate, a QoS queue of each board, and a quantity of online and offline users of each board.

* * * * *